(12) United States Patent
Denzel et al.

(10) Patent No.: US 12,370,642 B2
(45) Date of Patent: Jul. 29, 2025

(54) MAGNETIC BASE

(71) Applicant: C. & E. Fein GmbH, Schwaebisch Gmuend-Bargau (DE)

(72) Inventors: Sergej Denzel, Schwaebisch Gmuend (DE); Stefan Scherrenbacher, Waldstetten (DE)

(73) Assignee: C. & E. FEIN GMBH, Schwaebisch Gmuend-Bargau (DE)

( * ) Notice: Subject to any disclaimer, the term of this patent is extended or adjusted under 35 U.S.C. 154(b) by 868 days.

(21) Appl. No.: 17/220,670

(22) Filed: Apr. 1, 2021

(65) Prior Publication Data
US 2021/0308813 A1 Oct. 7, 2021

(30) Foreign Application Priority Data
Apr. 1, 2020 (DE) ...................... 20 2020 101 768.3

(51) Int. Cl.
*B23Q 3/154* (2006.01)
*B25H 1/00* (2006.01)

(52) U.S. Cl.
CPC ......... *B23Q 3/1543* (2013.01); *B25H 1/0071* (2013.01); *B23B 2260/10* (2013.01); *Y10T 408/554* (2015.01)

(58) Field of Classification Search
CPC ... Y10T 408/554; B25H 1/0071; B23B 47/00; B23Q 3/1543; B23Q 3/1546
USPC ................................. 408/76; 248/309.4, 683
See application file for complete search history.

(56) References Cited

U.S. PATENT DOCUMENTS

| | | | | |
|---|---|---|---|---|
| 2,672,770 A | * | 3/1954 | Buck | B25H 1/0071 408/712 |
| 2,826,965 A | * | 3/1958 | Bianchini | B25H 1/0057 15/93.1 |
| 2,863,338 A | * | 12/1958 | Stewart | B25H 1/0071 408/76 |
| 3,254,547 A | * | 6/1966 | Engelsted | B25H 1/0071 408/712 |
| 3,342,089 A | | 9/1967 | Palm | |
| 4,278,371 A | | 7/1981 | Meyer | |
| 5,275,514 A | | 1/1994 | Johnson | |
| 2009/0028653 A1 | | 1/2009 | Wilbert et al. | |

(Continued)

FOREIGN PATENT DOCUMENTS

| DE | 1552211 A1 | 10/1969 |
|---|---|---|
| DE | 3100933 C2 | 11/1985 |

(Continued)

*Primary Examiner* — Sunil K Singh
*Assistant Examiner* — Michael Vitale
(74) *Attorney, Agent, or Firm* — Muncy, Geissler, Olds & Lowe, P.C.

(57) ABSTRACT

A magnetic base for an electric power tool, in particular for a magnetic core drilling machine. The magnetic base having a base body, in which at least one first solenoid coil forming an electromagnet is accommodated in a receiving space, whose magnetic force is switchable between a maximum resulting holding force and a minimum resulting holding force. A first side that is adapted to be coupled with the electric power tool. An oppositely situated second side, which is adapted to be placed on a workpiece to be processed. The receiving space is designed such that an insertion of the at least one solenoid coil into the receiving space is possible only from the first side.

12 Claims, 7 Drawing Sheets

(56) References Cited

U.S. PATENT DOCUMENTS

| | | | | |
|---|---|---|---|---|
| 2011/0037547 A1* | 2/2011 | Cardone | ............... | B25B 11/002 335/289 |
| 2011/0043310 A1* | 2/2011 | Cardone | ............... | B25B 11/002 335/289 |
| 2017/0341195 A1* | 11/2017 | Reichert | .............. | B23Q 9/0014 |
| 2020/0376617 A1* | 12/2020 | Cardone | ............... | B25B 11/002 |

FOREIGN PATENT DOCUMENTS

| | | | | |
|---|---|---|---|---|
| DE | 19956155 B4 | 12/2011 | | |
| DE | 202012003188 U1 * | 8/2012 | ............. | B23B 45/02 |
| EP | 0222917 A1 * | 5/1987 | | |
| EP | 0554017 A1 | 8/1993 | | |
| KR | 200191031 Y1 * | 8/2000 | ........... | B23Q 3/1543 |
| KR | 20080103239 A * | 11/2008 | ........... | B23Q 3/1543 |

* cited by examiner

MAGNETIC BASE

This nonprovisional application claims priority under 35 U.S.C. § 119(a) to German Patent Application No. 20 2020 101 768.3, which was filed in Germany on Apr. 1, 2020 and which is herein incorporated by reference.

BACKGROUND OF THE INVENTION

Field of the Invention

The present invention relates to a magnetic base for an electric power tool, in particular for a magnetic core drilling machine, which includes a base body, in which at least one first solenoid coil forming an electromagnet is accommodated in a receiving space, whose magnetic force is switchable between a maximum resulting holding force and a minimum resulting holding force, the base body having a first side, which may be coupled with the electric power tool, and an oppositely situated second side, which may be placed on a workpiece to be processed.

Description of the Background Art

Magnetic bases of this type have long been known from the prior art and are customarily used to fasten electric power tools, such as magnetic core drilling machines, to the workpiece to be processed with the aid of magnetic holding force.

However, the accommodation of the coils of the electromagnets has proven to be disadvantageous. They are namely inserted into receiving spaces, which must first be worked into the base body by chip-forming machining. To achieve a preferably high magnetic holding force, these receiving spaces are generally worked into the base body from the side which will be placed on the workpiece later on. The receiving spaces into which the coils are inserted are then cast again in a complex manner, to electrically isolate the coils from the base body, on the one hand, and to prevent chips from penetrating the receiving spaces or the coils themselves, on the other hand. However, this involves the problem that the area of the casting compound is in direct contact with the workpiece, whereby contaminants, such as chips, may frequently accumulate, in particular at the transition between the casting area and the base body. Since the casting compound generally has a much lower hardness than the material of the base body, the wear on the magnetic base is increased thereby in this area.

SUMMARY OF THE INVENTION

It is therefore an object of the present invention to reduce the aforementioned disadvantages and, in particular, to provide a magnetic base which is less susceptible to contaminants and damage. The object of the invention is also to provide an improved electric power tool.

This object is achieved according to the invention by a magnetic base of the type mentioned at the outset, in that the receiving space is designed in such a way that an insertion of the at least one solenoid coil into the receiving space is possible only from the first side.

This achieves the fact that the magnetic base has a planar surface on the second side, which is usually placed on the workpiece to be processed, and chips, which occur during the processing of the workpieces, are unable to enter the area of the cast receiving spaces in the first place, whereby wear resulting from the displacement of the magnetic base is reduced. The danger of damage to the solenoid coil itself may also be reduced or ruled out hereby.

It has has also proven to be favorable if the receiving space is limited on the second side by a preferably continuous bottom, which is integrally formed with the base body. The bottom is thus formed as a single piece with the base body, which makes it possible to achieve a simple manufacturing of the base body. The receiving spaces must be worked in a chip-forming manner into the base body only from the first side, the bottom remaining in the area of the receiving spaces. In this connection, it has also proven to be successful if the thickness of the bottom of the receiving space is 0.2 mm or more, preferably 0.3 mm or more and particularly preferably 0.4 mm or more and further preferably 0.8 mm or less, preferably 0.7 mm or less and particularly preferably 0.6 mm or less and most preferably 0.5 mm. A sufficient stability of the base body in the area of the receiving space is achieved hereby, and the fact that a magnetic saturation of the bottom in the area of the receiving space occurs is simultaneously ensured, whereby the weakening of the magnetic field lines actually to be expected, due to the magnetic short-circuit, is only so slight that the resulting magnetic force is only very slightly weakened, so that the resulting magnetic force is still sufficient to securely fasten the electric power tool connected to the magnetic base to a workpiece.

The mounting of the magnetic base is also favored if the receiving space has an annular cross-section. The premounted coil may be easily inserted into the receiving space hereby. The resulting magnetic force may also be even further improved if the receiving space surrounds a cylindrical yoke, whereby the conduction of the magnetic field lines is improved. It is also provided that the solenoid coil can have a rectangular, oval, polygonal or oblong—elongated round—cross-section. The receiving space and the yoke are each adapted to the shape of the solenoid coil.

It has also proven to be particularly advantageous if the base body is provided with a multi-part design and includes a receiving body, in which the receiving space is formed, and a yoke plate, which closes off the receiving space in the direction of the first side. The manufacturing complexity may be reduced hereby for the chip-forming machining of the base body. It is namely sufficient if the receiving space is worked in a chip-forming manner only out of the receiving body. Within the scope of the invention, it has also proven to be advantageous in this connection if the receiving space is also partially worked into the yoke plate. This makes it possible to ultimately provide the base body with a very flat design, which has a positive influence on the possible applications of the magnetic base.

To prevent liquid from penetrating the magnetic base, it has also be proven to be particularly favorable in this connection if a sealing element is provided between the receiving body and the yoke plate. It has also be proven to be successful if the sealing element is designed as a round or flat seal, which may be inserted into corresponding indentations, which are formed on the receiving body and/or the yoke plate. The receiving body and the yoke plate are preferably screwed to each other. Multiple screws may be used for this purpose, which are screwed into the receiving body through the yoke plate from the first side. Within the scope of the invention, it is also provided that the yoke plate is provided multiple times and is at least partially inserted into the receiving spaces.

It has also proven to be successful if the width and/or the length of the yoke plate essentially corresponds to the width and/or the length of the base body. By matching the size of the two components to each other, it is achieved, in particular, that the base body has flat side surfaces, and interfering edges or steps are avoided. Within the scope of the invention, however, it is also provided that the yoke plate is smaller than the base body and is adapted to the receiving space in terms of shape and size. For example, the yoke plate may have a round basic shape with an edge or a collar, which is insertable into a receiving shoulder, which is formed on the receiving body.

It has also proven to be advantageous if passages are formed in the yoke plate. This ultimately makes it possible to connect the solenoid coil arranged in the receiving space to the electric power tool for the purpose of switching on the coil and thus being able to change the magnetic force of the magnetic base.

It has also proven to be particularly favorable if the at least one solenoid coil is cast in the receiving space. This easily and effectively ensures that the solenoid coil is secured in the receiving space and is isolated with respect to the surrounding base body. Within the scope of the invention, it has also proven to be successful if the casting compound used for the casting is supplied to the receiving space from the first side.

It has also proven to be successful if the at least one solenoid coil is provided multiple times, particularly preferably twice. The resulting magnetic force may be increased hereby. In this regard, it is provided within the scope of the invention that the two solenoid coils are arranged in a shared receiving space, or the two solenoid coils are each arranged in a separate receiving space.

The object relating to the electric power tool is achieved by an electric power tool, which includes a magnetic base according to one of claims 1 through 11.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein: The invention is explained in greater detail below on the basis of multiple exemplary embodiments illustrated in the drawings, where.

DETAILED DESCRIPTION

Figure 1:
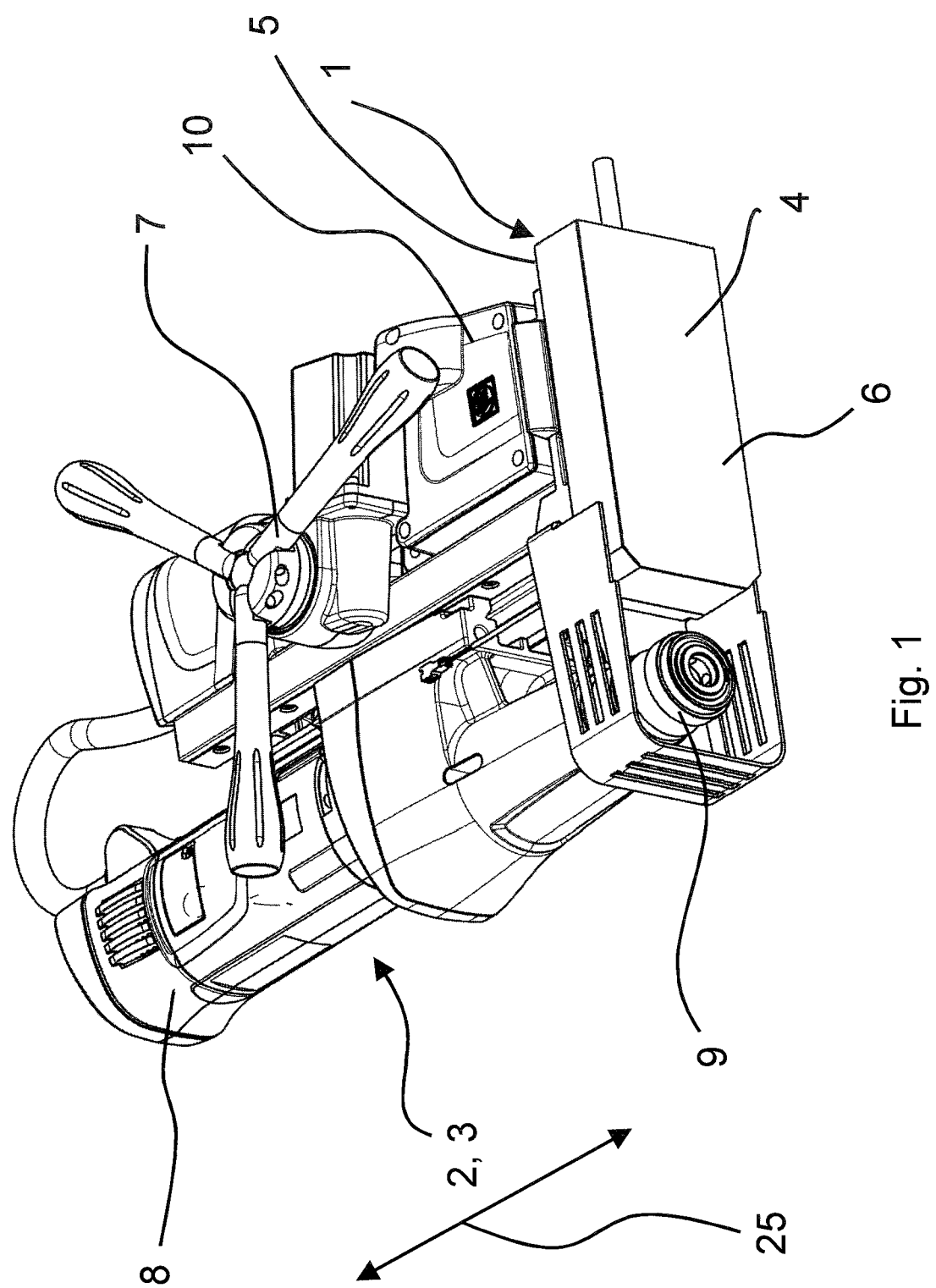
FIG. 1 shows a magnetic base, which is fastened to an electric power tool.

FIG. 1 shows a perspective view of a magnetic base 1, which is fastened to an electric power tool 2, in the present example to a magnetic core drilling machine 3. Magnetic base 1 includes a base body 4 having a first side 5, which is coupled with electric power tool 2, and to an oppositely situated second side 6, which may be placed on a workpiece to be processed. With the aid of a manually-operable adjusting mechanism 7, a drive motor 8, with which a tool holder 9 is rotatably fixedly coupled, is adjustable with respect to magnetic base 1 and an electronic unit 10 connected thereto, as indicated by arrow 25. To fasten electric power tool 2 to a workpiece, the power tool is placed with second side 6 of magnetic base 1 on a magnetizable workpiece, and magnetic base 1 is switched on. For this purpose, solenoid coils 11 are arranged in base body 4 of magnetic base 1, which each form an electromagnet 12, as is further explained below based on the individual specific embodiments of magnetic base 1.

Figure 2:
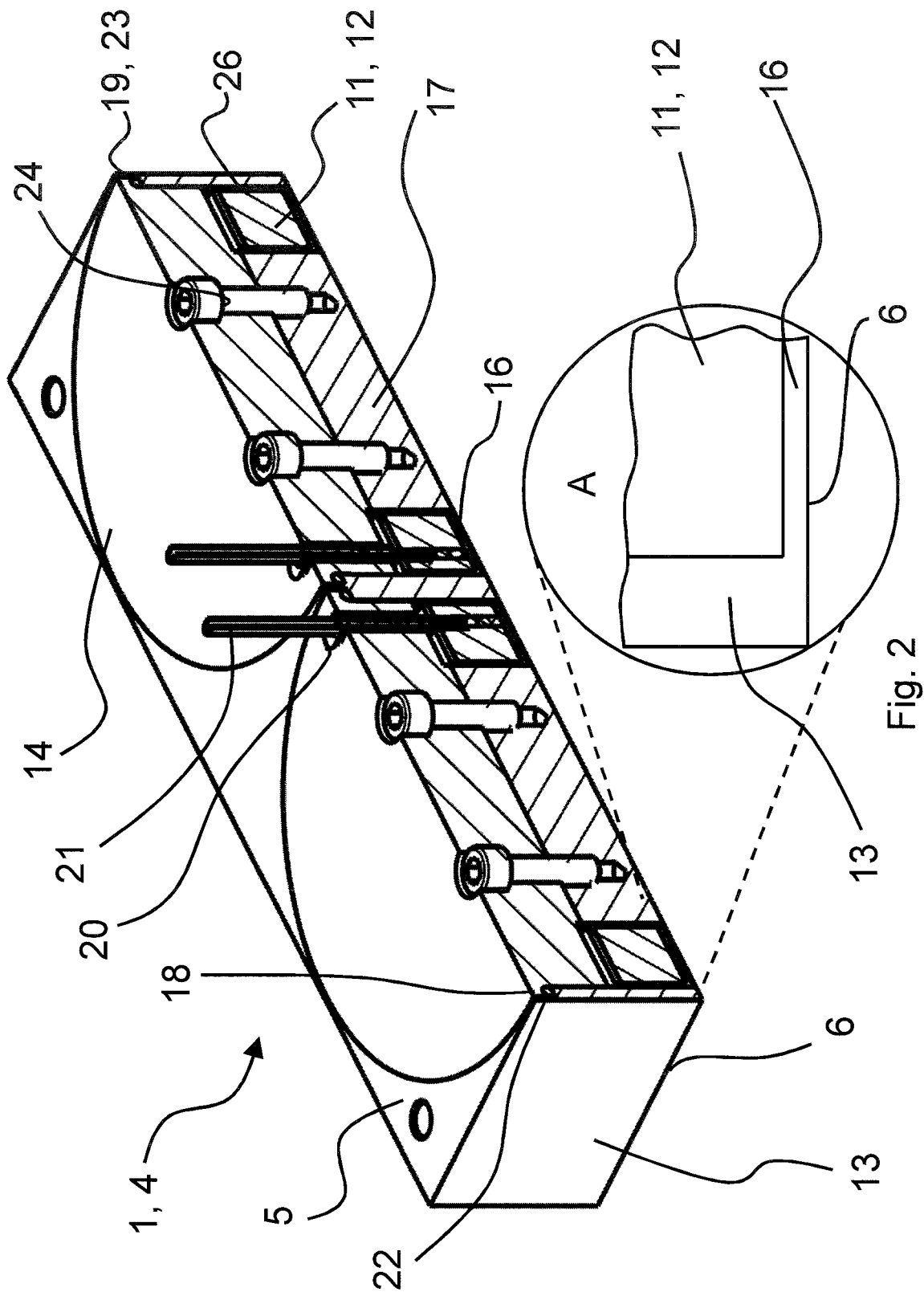
FIG. 2 shows a longitudinal section of a first specific embodiment of a magnetic base, including a detailed view of detail A.

FIG. 2 shows a longitudinal section of a first specific embodiment of magnetic base 1. It is apparent herefrom that base body 4 has a multi-part design and includes a receiving body 13 and two yoke plates 14. Two receiving spaces 15 are formed in receiving body 13, which are closed by yoke plates 14 and in each of which one of solenoid coils 11 is accommodated, which form electromagnets 12. The magnetic force of electromagnets 12 is switchable between a maximum resulting holding force and a minimum resulting holding force, whereby it is possible for the user to securely fasten electric power tool 2 connected to magnetic base 1 to a workpiece and also to release it therefrom as needed.

Receiving space 15 formed in receiving body 13 is designed in such a way that an insertion of solenoid coil 11 is possible only from first side 5—i.e. from the side facing away from the workpiece. As is apparent, in particular, from detail A, which is illustrated in FIG. 2, receiving space 15 is limited on second side 6 by a continuous bottom 16, which is integrally formed with base body 4 or with receiving body 13. This bottom 16 is, however, provided with a thin design, in such a way that the magnetic short-circuit resulting thereby does not have a significant negative influence on the resulting holding force of magnetic base 1. In the illustrated exemplary embodiments, the thickness of bottom 16 of receiving space 15 is exactly 0.5 mm. Receiving space 15 has an annular cross-section, whose size is adapted to the size of solenoid coil 11 and surrounds a cylindrical yoke 17. Solenoid coils 11 are cast in receiving space 15 using a casting compound 26 to define the position of electromagnet 12 in receiving space 15 as well as for the purpose of electrical isolation of electromagnet 12 with respect to receiving body 13 or with respect to base body 4 of magnetic base 1.

As already described above, base body 4 in the first exemplary embodiment is provided with a multi-part design and includes receiving body 13, in which receiving space 15 is formed, and yoke plates 14, which close off receiving space 15 in the direction of first side 5. In the illustrated exemplary embodiment, a total of two yoke plates 14 are provided, which each have a cylindrical cross-section and additionally also possess a radial edge 18, which engages with a receiving shoulder 19, which is formed in receiving body 13. Yoke plates 14 are secured on receiving body 13, specifically on yoke 17, by screws 24.

Figure 3:
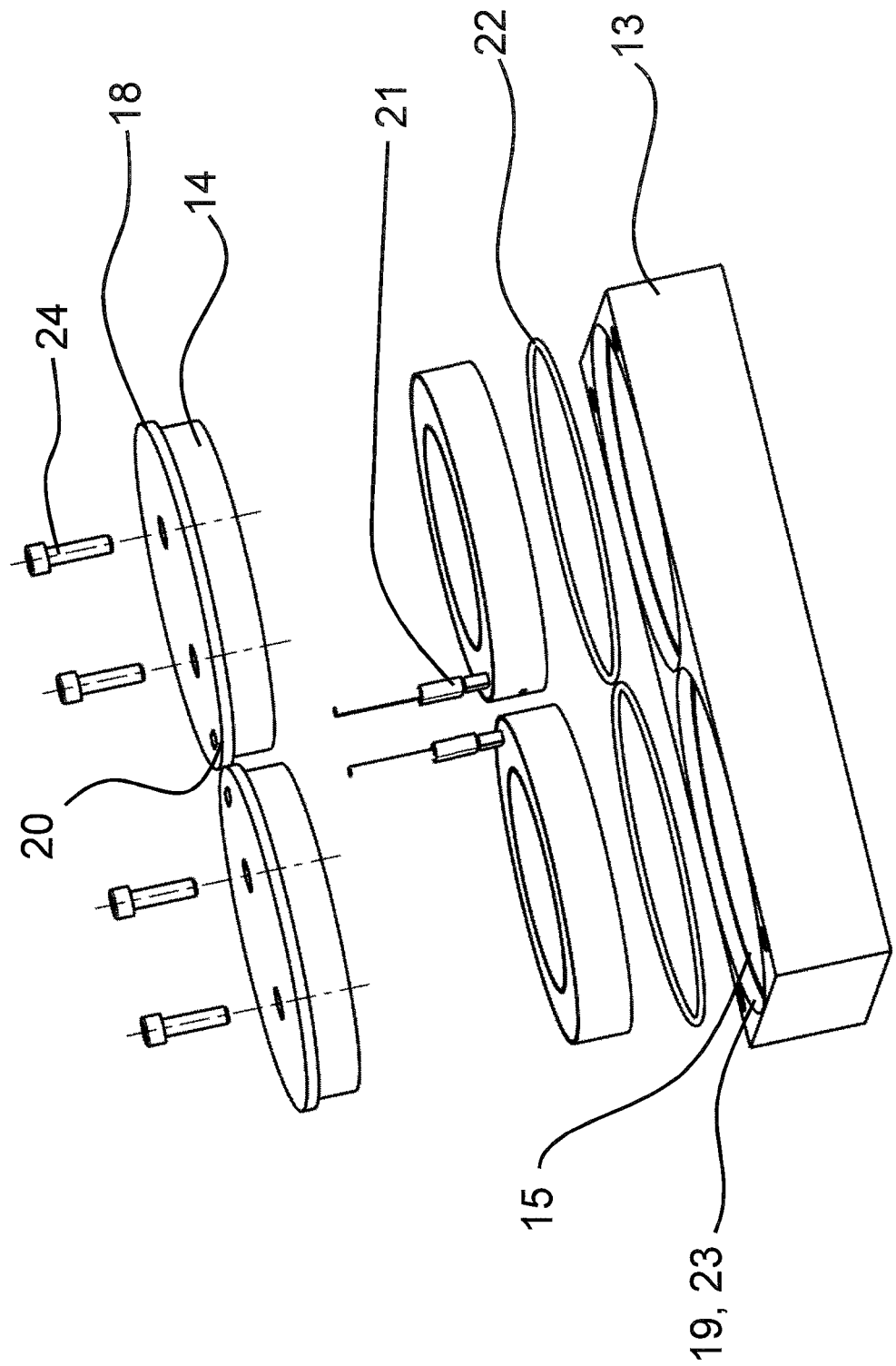
FIG. 3 shows an exploded view of the first specific embodiment of the magnetic base from FIG. 2.

The exact design of yoke plates 14 becomes clear, in particular once again from the exploded view of the first specific embodiment of magnetic base 1 illustrated in FIG. 3. It is also apparent from this figure that passages 20 are formed in yoke plates 14, which make it possible to run connecting cables 21 from solenoid coil 11 to electric power tool 2 arranged on first side 5 of magnetic base 1. To avoid a penetration of foreign bodies and/or liquid into receiving space 15, a sealing element 22 is also arranged between receiving body 13 and yoke plates 14 in each case, which is inserted into grooves 23, which are formed in base body 4, specifically in receiving body 13 and/or in yoke plates 14.

Figure 4:
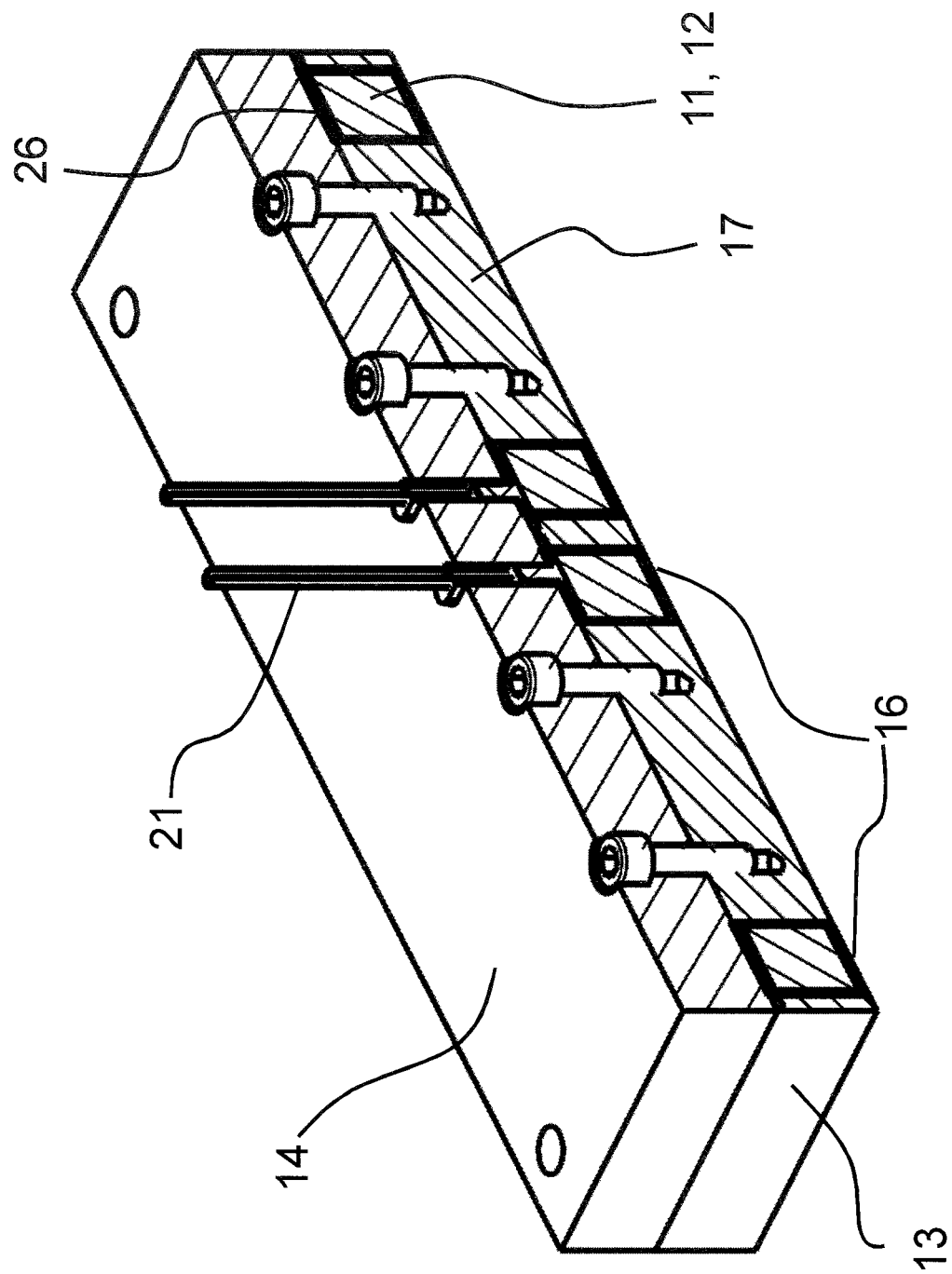
FIG. 4 shows a longitudinal section of a second specific embodiment of a magnetic base.
Figure 5:
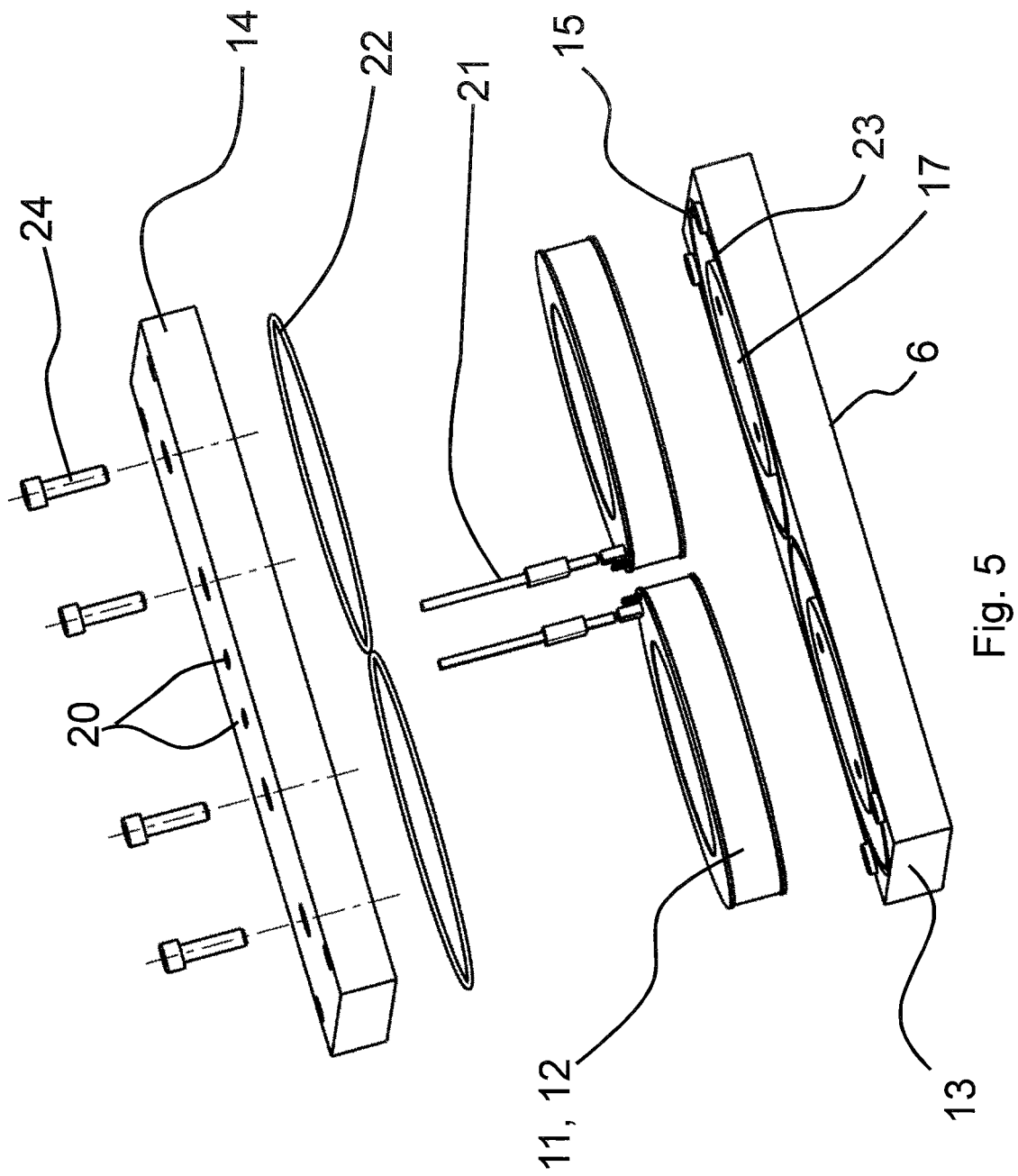
FIG. 5 shows an exploded view of the second specific embodiment of the magnetic base from FIG. 4.

FIG. 4 shows a second specific embodiment of magnetic base 1 according to the invention, in which base body 4 is also provided with a multi-part design. In contrast to the first specific embodiment, in the second specific embodiment, only one yoke plate 14 is provided in addition to receiving body 13, whose width and length essentially correspond to the width and the length of receiving body 13. This has, in particular, manufacturing advantages, namely in that the height of the source material of receiving body 13 may be kept quite minimal, and only receiving spaces 15 for solenoid coils 11 need to be worked out of base body 4. Receiving spaces 15 may then be covered by yoke plate 14, which is screwed to receiving body 13 with the aid of screws 24. It is also apparent, in particular, from the exploded view of the second exemplary embodiment illustrated in FIG. 5 that grooves 23 are formed in the side of receiving body 13 facing yoke plate 14, into which sealing elements 22 may be inserted to seal receiving spaces 15 against external influences.

Figure 6:
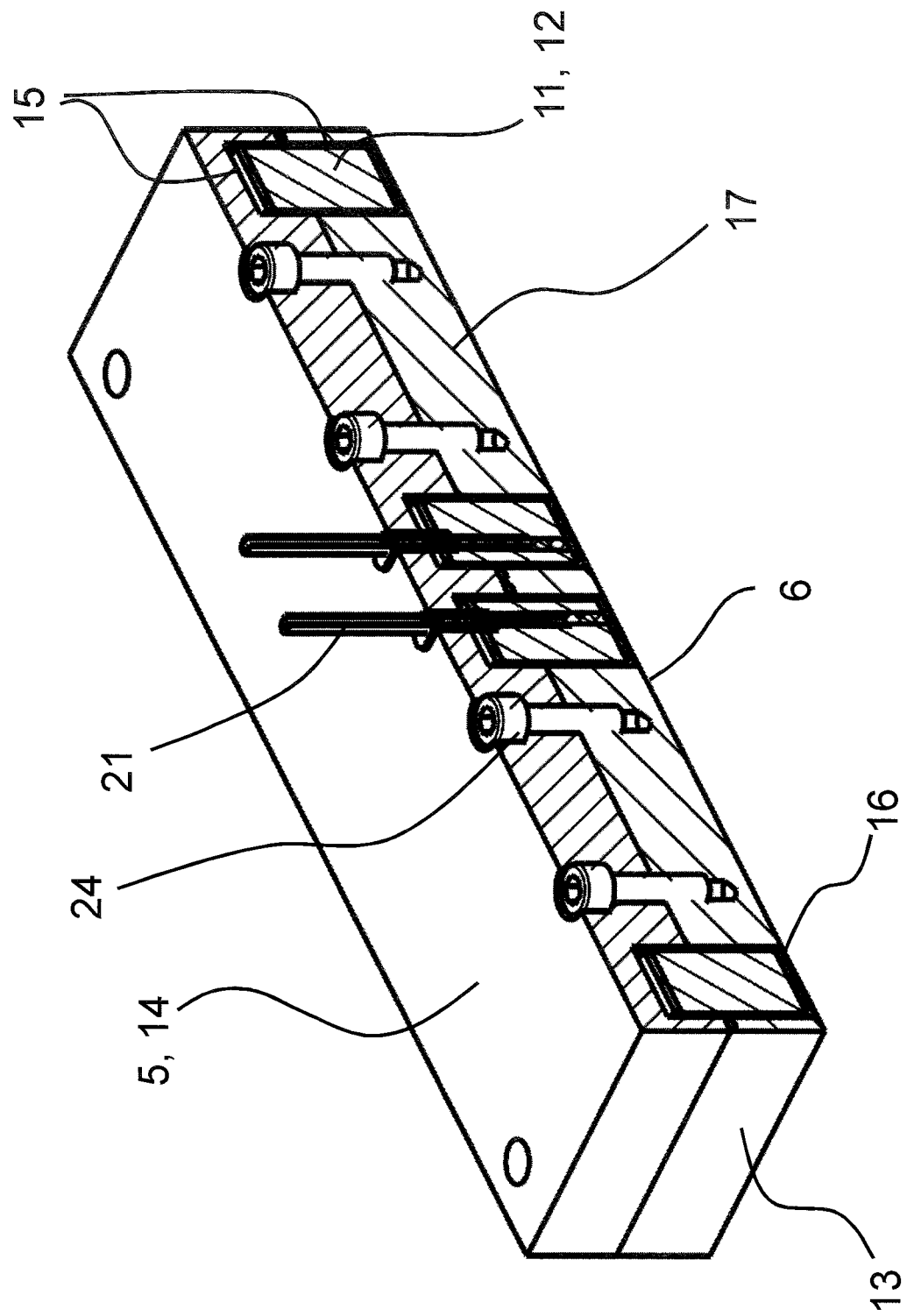
FIG. 6 shows a longitudinal section of a third specific embodiment of a magnetic base.

A third specific embodiment of magnetic base 1 according to the invention is illustrated in FIG. 6. In this specific embodiment, receiving space 15 is formed in receiving body 13, on the one hand, and in yoke plate 14, on the other hand. This has the advantage that the installation height of magnetic base 1 may be further reduced, which thereby has a positive influence on the possible use and purpose of an electric power tool 2 connected thereto.

Figure 7:
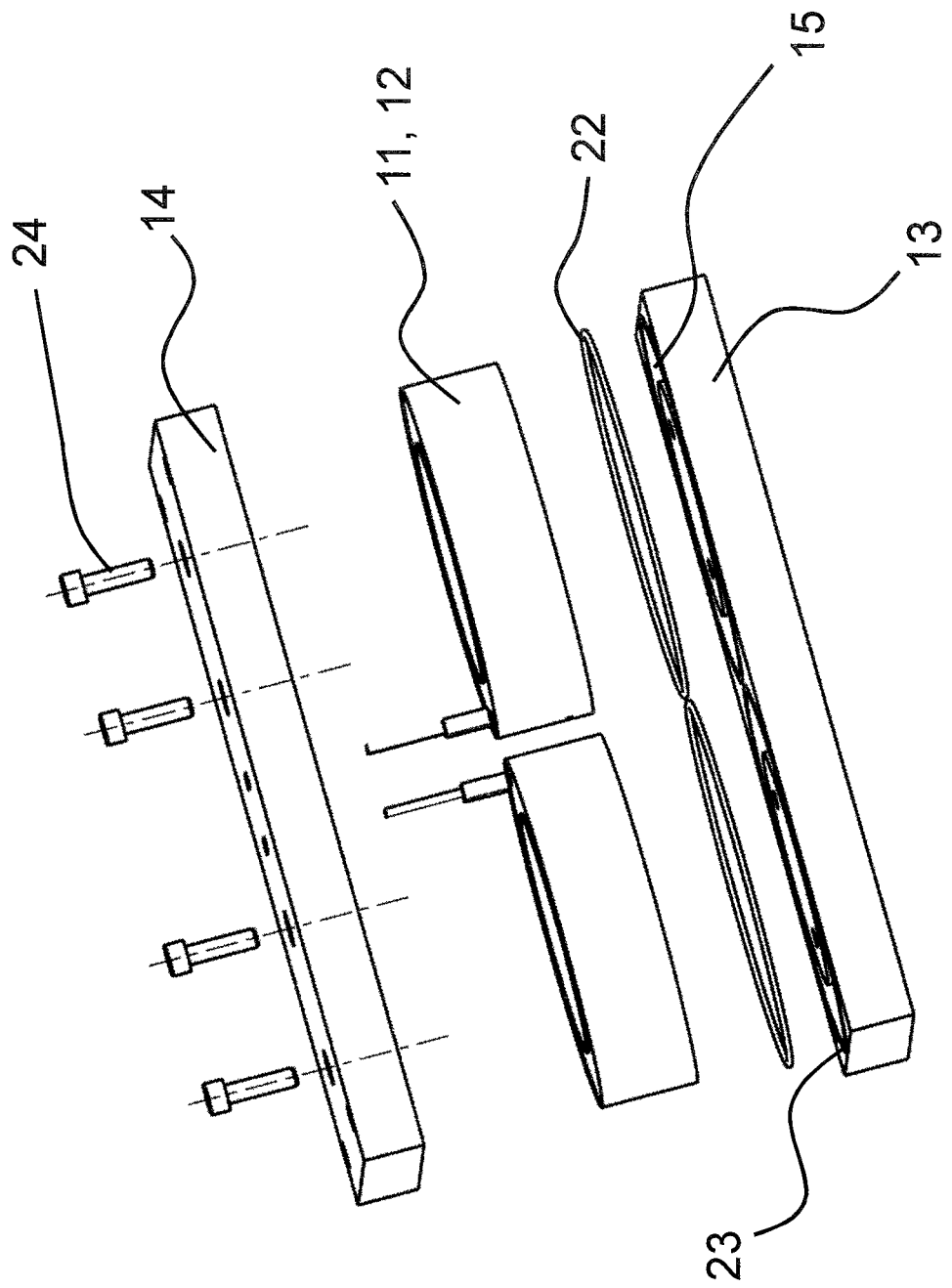
FIG. 7 shows an exploded view of the third specific embodiment of the magnetic base from FIG. 6.

The exploded view illustrated in FIG. 7 again makes it apparent that the height of solenoid coils 11 accommodated in magnetic base 1 is greater than the height of receiving body 13. In this exemplary embodiment as well, sealing elements 22 are arranged between yoke plate 14 and receiving body 13, which are accommodated in a groove 23 formed in receiving body 13. In this exemplary embodiment, yoke plate 14 is also connected to base body 4 via screws 24.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A magnetic base for an electric power tool, the magnetic base comprising:
    a base body, in which at least one solenoid coil forming an electromagnet is accommodated in a receiving space, a magnetic force of the at least one solenoid coil being switchable between a maximum resulting holding force and a minimum resulting holding force;
    the base body having a first side that is adapted to be coupled with the electric power tool and an oppositely situated second side that is adapted to be in contact with a workpiece during processing of said workpiece,
    wherein the receiving space is designed such that an insertion of the at least one solenoid coil into the receiving space is possible only from the first side of the base body,
    wherein the receiving space surrounds a cylindrical yoke,
    wherein the at least one solenoid coil annularly surrounds the cylindrical yoke,
    wherein the base body has a multi-part design and includes a receiving body and a yoke plate, the yoke plate being disposed on the receiving body such that a bottom surface of the yoke plate opposes an upper surface of the receiving body,
    wherein the receiving space is recessed from a portion of the upper surface of the receiving body to accommodate the at least one solenoid coil therein, such that when the yoke plate is disposed on the receiving body, the yoke plate closes off the receiving space in a direction of the first side,
    wherein a width of the bottom surface of the yoke plate has a same value as a width of the upper surface of the receiving body, and wherein a length of the bottom surface of the yoke plate has a same value as a length of the upper surface of the receiving body,
    wherein a plurality of passages are formed in the yoke plate, and
    wherein connecting cables, which extend from the at least one solenoid coil and are connectable to the electric power tool, pass through the plurality of passages formed in the yoke plate to an exterior of the base body.

2. The magnetic base according to claim 1, wherein the receiving space is limited on the second side of the base body by a continuous bottom, which is integrally formed with the base body.

3. The magnetic base according to claim 2, wherein a thickness of the continuous bottom of the receiving space is in a range from 0.2 mm to 0.8 mm.

4. The magnetic base according to claim 2, wherein a thickness of the continuous bottom of the receiving space is in a range from 0.3 mm to 0.7 mm.

5. The magnetic base according to claim 2, wherein a thickness of the continuous bottom of the receiving space is in a range from 0.4 mm to 0.6 mm.

6. The magnetic base according to claim 1, wherein the receiving space has an annular cross-section.

7. The magnetic base according to claim 1, wherein a sealing element is provided between the receiving body and the yoke plate.

8. The magnetic base according to claim 1, wherein the at least one solenoid coil is cast in the receiving space with a casting compound.

9. The magnetic base according to claim 1, wherein a plurality of the at least one solenoid coil is provided.

10. An electric power tool, the electric power tool comprising:
    the magnetic base according to claim 1.

11. The electric power tool according to claim 10,
    wherein the electric power tool is a magnetic core drilling machine, and the electric power tool further comprises a drive motor and a tool holder for receiving a core drill bit, and
    wherein the drive motor provides for rotation of the tool holder.

12. A magnetic base for an electric power tool, the magnetic base comprising:
    a base body, in which at least one solenoid coil forming an electromagnet is accommodated in a receiving space, a magnetic force of the at least one solenoid coil being switchable between a maximum resulting holding force and a minimum resulting holding force;

the base body having a first side that is adapted to be coupled with the electric power tool and an oppositely situated second side that is adapted to be in contact with a workpiece during processing of said workpiece, wherein the receiving space is designed such that an insertion of the at least one solenoid coil into the receiving space is possible only from the first side of the base body, wherein the receiving space surrounds a cylindrical yoke, wherein the at least one solenoid coil annularly surrounds the cylindrical yoke, wherein the base body includes a receiving body and a yoke plate, wherein a first portion of the receiving space is provided in the receiving body and a second portion of the receiving space is provided in the yoke plate, wherein the first portion of the receiving space is recessed from an upper surface of the receiving body that faces the yoke plate, wherein the second portion of the receiving space is recessed from a lower surface of the yoke plate that faces the receiving body, wherein the at least one solenoid coil extends outside of the first portion of the receiving space of the receiving body so as to extend outside of the receiving body and extends into the second portion of the receiving space of the yoke plate, wherein a plurality of passages are formed in the yoke plate, and wherein connecting cables, which extend from the at least one solenoid coil and are connectable to the electric power tool, pass through the plurality of passages formed in the yoke plate to an exterior of the base body.

* * * * *